M. B. MacNEILLE.
BEARING.
APPLICATION FILED FEB. 15, 1918.
1,277,446.
Patented Sept. 3, 1918.
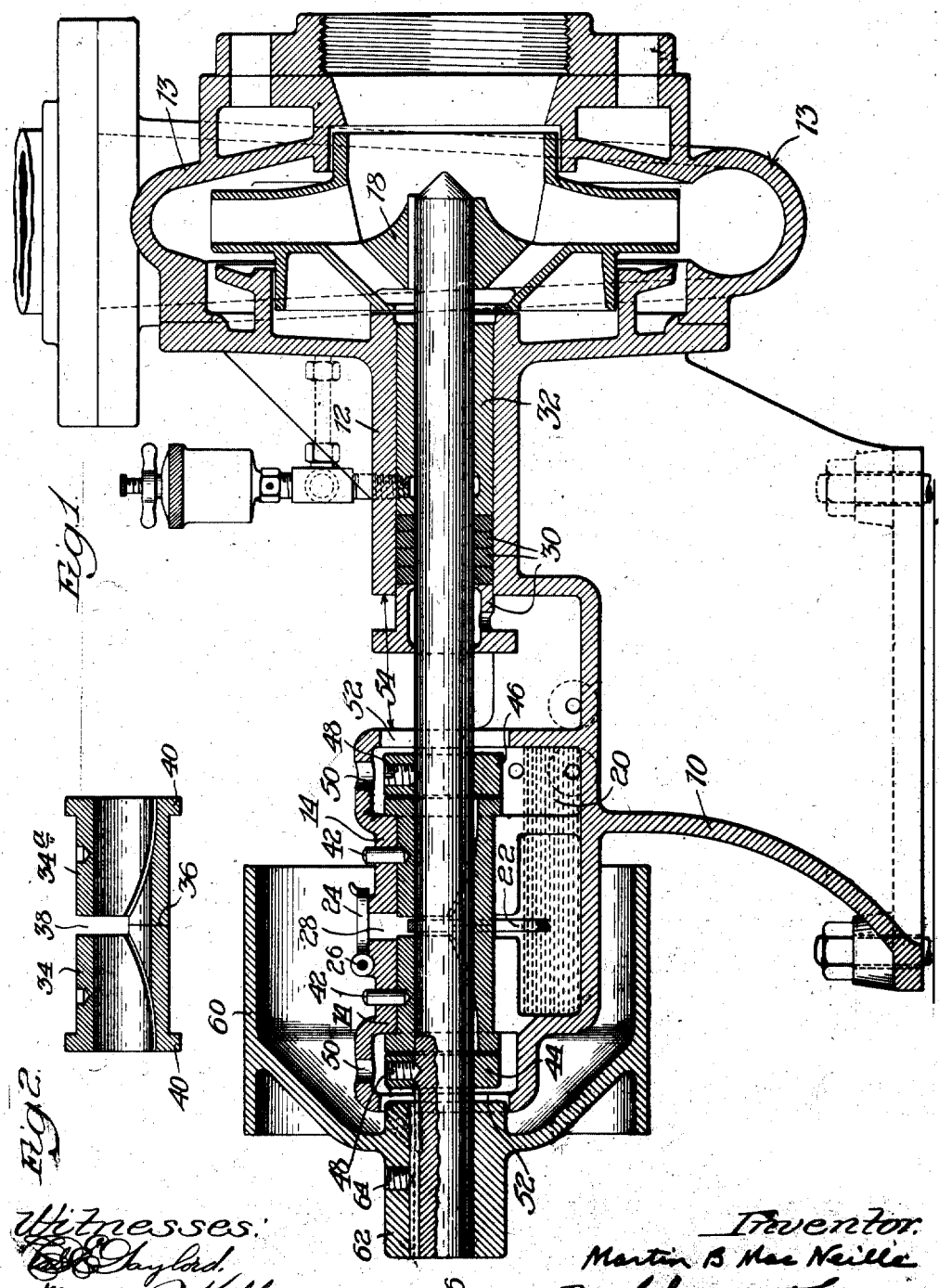

UNITED STATES PATENT OFFICE.

MARTIN B. MacNEILLE, OF BELOIT, WISCONSIN, ASSIGNOR TO FAIRBANKS, MORSE & COMPANY, OF CHICAGO, ILLINOIS, A CORPORATION OF ILLINOIS.

BEARING.

1,277,446.   Specification of Letters Patent.   Patented Sept. 3, 1918.

Application filed February 15, 1918. Serial No. 217,432.

*To all whom it may concern:*

Be it known that I, MARTIN B. MAC-NEILLE, a citizen of the United States, residing at Beloit, in the county of Rock and State of Wisconsin, have invented a certain new and useful Improvement in Bearings, of which the following is a specification.

This invention relates to shaft bearings. It may be used on all sorts of machines but is especially applicable to centrifugal pumps and is therefore shown so applied.

The objects of the invention are to provide a bearing having the driving pulley so mounted as to encircle the bearing and thus reduce the bearing strain; also to so construct the bearing itself as to eliminate the casting of the bearing cap as a separate piece, thus eliminating the usual expense of machining the cap and the adjacent frame casting each separately.

The invention consists in mechanism attaining the foregoing objects which can be easily and cheaply made, which is satisfactory in use and not readily liable to get out of order. More particularly, it consists in the features and details of construction hereafter more fully set forth in the specification and claims.

Referring to the drawings, in which similar numerals refer to the same parts throughout the several views, Figure 1 is a vertical sectional detail view of a side suction moderate head, inclosed water balanced centrifugal pump of a type now well known in the art, having this invention applied to its main shaft.

Fig. 2 is a central sectional detail view of the bearing lining members removed from other mechanism.

The main frame of the machine 10, supports a forward or pump bearing box 12 carrying the pump case 13 and a rear or main bearing box 14, the two being in alinement with each other. Through these bearings is inserted the main shaft 16, to whose forward end the pump impeller 18, located in case 13 and forming no part of this invention, is attached.

In the base of bearing box 14 is an oil chamber 20, into which oil ring 22 dips in the usual manner, oil being supplied to the chamber 20 by upwardly tilting cap 24 on pivot 26 so as to expose entrance oil port 28.

Forward bearing 12 contains a stuffing box 30 and impeller bushing 32, while main bearing 14 is provided with a two piece bearing lining composed of the parts 34 and 34$^a$ abutting on the line 36 and cut away on top at 38 for the reception of oil ring 22. The interior diameters of the two bearing boxes 12 and 14, where the bearing lining parts heretofore named contact them, are of the same diameter and are bored at one operation.

The bearing lining members 34 and 34$^a$ are, as shown preferably, but not necessarily, provided with flanged ends 40 abutting adjacent parts of the interior of the box 14 and are rigidly secured in place by any suitable means as, for instance, the pins 42.

The shaft 16 is secured in longitudinal position with reference to the main bearing by a pair of collars 44 and 46 rigidly attached to the shaft by screws 48 entered through holes 50 provided for the purpose in the top of bearing box 14. The parts heretofore described as being inside bearing box 14 are inserted therein through suitable end openings 52 provided for the purpose.

Bearing boxes 12 and 14 are separated one from the other by a space greater in width than the length along the shaft of any part described which has to be inserted within an adjacent bearing box so that such a part, for instance, bearing part 34$^a$, can in assembling the device be dropped down into this space 54 and then shoved into its place in bearing 14 preparatory to the reception of the shaft. This operation is necessary in view of the fact that bearing box 14 is cast in one piece as is bearing box 12.

Bearing box 14 overhangs main frame 10, so that driving pulley 60, provided with an overhanging hub 62 secured to shaft 16 by screw 64 or other suitable means, is substantially concentric with the bearing and the belt strain on pulley 60 is applied directly about the main bearing, thus producing the most efficient action possible.

Having thus described my invention, what I claim as new, and desire to secure by Letters Patent, is:

1. In a device of the class described, a bearing box and bearing member insertible inside the box through an opening in its end, means securing the bearing member to the box, a shaft through the bearing and means preventing lengthwise movement of the shaft with reference to the bearing and box.

2. In a device of the class described, a bearing box and bearing member insertible inside the box through an opening in its end, means securing the bearing member to the box, a shaft through the bearing and collars on the shaft at opposite ends of the bearing preventing lengthwise movement of the shaft with reference to the bearing box.

3. In a device of the class described, a bearing box and bearing member insertible inside the box through an opening in its end, means securing the bearing member to the box, a shaft through the bearing, and collars on the shaft at opposite ends of the bearing inclosed within and protected by the bearing box preventing lengthwise movement of the shaft with reference to the bearing and box.

4. In a device of the class described, a single piece bearing box bored out to receive a shaft and provided with an oil chamber, an oil ring on the shaft entering the oil chamber, a two piece bearing member around the shaft inside the box inclosing the ring between them, and means inclosed within the box preventing longitudinal movement of the shaft with reference to the bearing.

5. In a device of the class described, a single piece bearing box bored out to receive a shaft and provided with an oil chamber, an oil ring on the shaft entering the oil chamber, a two piece bearing member around the shaft inside the box, and detachable means inclosed within the box preventing longitudinal movement of the shaft with reference to the bearing.

6. In a device of the class described, in combination with a suitable support, two alined bearing boxes open at their ends adjacent to each other, a bearing member for use in one of said bearing boxes of less length than the distance between the boxes, insertible via the space between the boxes into place in one of the boxes, means for securing the bearing member in place in its box, and a shaft through the boxes supported by the bearing member, for the purposes set forth.

In witness whereof, I have hereunto subscribed my name in the presence of two witnesses.

MARTIN M. MacNEILLE.

Witnesses:
 EMIL PODEWILS,
 HENRY MADSEN.